United States Patent Office 3,654,222
Patented Apr. 4, 1972

---

3,654,222
NOVEL ORGANOTIN STABILIZER COMPOSITIONS AND RESIN COMPOSITIONS STABILIZED THEREWITH
Christian H. Stapfer, Newtown, Pa., and Ashok C. Shah, Flemington, N.J., assignors to Cincinnati Milacron Chemicals Inc., Reading, Ohio
No Drawing. Filed Nov. 21, 1969, Ser. No. 878,950
Int. Cl. C08g 45/62
U.S. Cl. 260—45.75 K                       17 Claims

ABSTRACT OF THE DISCLOSURE

Halogen-containing polymers such as polyvinyl chloride are stabilized against degradation caused by heat, oxidation and light by (means of) a combination of an alkyltin carboxylate and a monoalkyltin sulfide. Optionally, an alkyl substituted phenol may be included.

---

The present invention relates to a stabilizer composition for halogen-containing resins, such as, polyvinyl chloride, polyvinylidene chloride and copolymers thereof against degradation caused by heat, oxidation and light. The deleterious effects of heat, light and oxidation on the stability of polyvinyl halides is well known to the art and better stabilizing compositions improving early color, long term heat stability and light stability of such polymers are constantly being sought.

We have unexpectedly discovered that degradation of halogen-containing resins can be considerably reduced by the use of either.

(A) a binary system comprising a dihydrocarbyltin carboxylate of the general formula:

$$[R_2Sn(OCOR')_2]_m$$

and a monohydrocarbyltin sulfide of the general formula:

$$RSnS_{1.5}$$

or any sulfhydrated derivative thereof, such as

generally referred to as hydrocarbyl thiostannoic acids. The term monohydrocarbyl tin sulfide as used therein includes the compounds generally known as monohydrocarbyl thiostannoic acids, or, (B) a tertiary system comprising the above binary stabilizer system and, acting as an anti-oxidant, an alkyl substituted monomeric (I) phenol of the general formulae

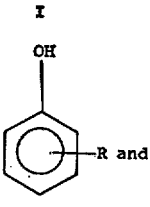 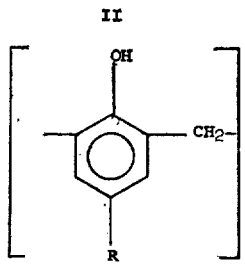

In all of the above formulae, R denotes alkyl radicals having 1 to 12 carbons. R' is the organic moiety of a mono- or dibasic carboxylic acid and m is an integer of at least 1 and n is an integer of at least 2.

Some illustrations of organotin carboxylates suitable for practicing the present invention are dibutyltin maleate, dibutyltin azelate, dibutyltin bis (isooctylazelate), dibutyltin laurate, dibutyltin bis (isooctyl maleate), dioctyltin bis (isooctyl maleate), dimethyltin benzoate, and diethyltin bis (laurylthiodipropionate).

The organic moiety of the carboxylic acids may be a saturated or unsaturated aliphatic hydrocarbon group having a straight chain or branched chain or may be an aromatic group. Examples of acids having these organic moieties are acetic acid, propionic acid, n-butyric acid, isobutyric acid, valeric acid, caproic acid, 2-ethyl hexanoic acid, lauric acid, acrylic acid, α-methylacrylic acid, crotonic acid, hydrosorbic acid, benzoic acid, malonic acid, succinic acid, methylsuccinic acid, glutaric acid, adipic acid, azelaic acid, maleic acid and glutaconic acid. The organic moiety may also contain ester groups, thio ether groups with formula such as $-CH_2CH_2SR$ and

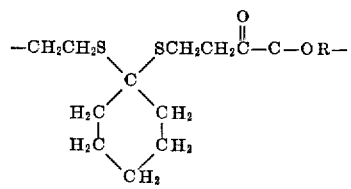

and combinations thereof. Examples of acids containing these latter organic moieties are the monobutyl, monooctyl and monoisooctyl esters of malonic acid succinic acid, azelaic acid or maleic acid;

$$CH_3CH_2CH_2SCH_2CH_2COOH$$

 and

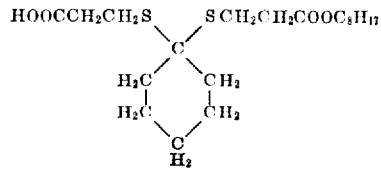

The monohydrocarbyltin sulfides are exemplified by monomethylthiostannoic acid, monobutylthiostannoic acid, monomethyl tin sulfide, monobutyl tin sulfide and monooctyltin sulfide, while typical alkyl phenols are metacresol, para-nonyl-phenol, para-dodecyl-phenol and poly (orthomethylene-para-octyl phenol).

The combinations of the present invention are used in amounts of 0.01 to 5 percent by weight of the resins.

The ratio between the dihydrocarbyltin carboxylate and the monohydrocarbyltin sulfide may vary from 9:1 to 1:9. The preferred range is a ratio of 1.5:1 to 1:1.5 with optimum synergistic results usually occuring at a ratio of about 1:1.

Neither dihydrocarbyltin carboxylates nor monohydrocarbyltin sulfides are commercially useful stabilizers individually. Both tend either to produce early color in polyvinyl halide resins or have poor heat and light stability.

The second embodiment of the present invention combines the use of alkyl phenols with the synergistic combination to further improve light stability and early color while enhancing the clarity. These advantages are even more important because the alkyl phenols may be used as inexpensive diluents or carriers for the organotin stabilizer combination. The deleterious effects of the alkyl phenols, even long term stability are insignificant when they are used in amounts up to 30 percent by weight of the total stabilizer system and deleterious effects do not become serious unless more than 50 percent is used. They are particularly useful in rigid formulations of polyvinyl halides because they do not plasticize when used in the recommended amounts.

The synergistic combinations of the present invention are useful for the class of polyvinyl halide resin mixtuures and copolymers thereof containing at least 50 weight percent of the polyvinyl halide. Suitable polyvinyl halide resins include polyvinyl chloride, polyvinyl bromide and polyvinylidene chloride. The mixtures may be prepared by blending the polyvinyl halide resin with other resins, such as ethylenically unsaturated polymers and copolymers including, polyvinyl acetate, polystyrene, polyacrylates and polymethacrylates, as well as acrylonitrile-butadiene-styrene copolymers. The copolymers which are suitable include copolymers of vinyl halides with other vinyl halides or ethylenically unsaturated monomers such as vinyl acetate, styrene and the like.

The following examples are presented.

EXAMPLE 1

Six resin formulations of one hundred parts of Geon 103 EP, a general purpose suspension polyvinyl chloride resin manufactured by the B. F. Goodrich Co. was lubricated with 0.5 part of mineral oil. Each of the formulates was stabilized with one of the following:

(a) 1.6 parts of dibutyltin azelate [1]
(b) 1.35 parts of dibutyltin azelate and 0.15 part of butylthiostannoic acid
(c) 0.6 part of dibutyltin azelate and 0.6 part of butylthiostannoic acid
(d) 0.1 part of dibutyltin azelate and 0.85 part of butylthiostannoic acid
(e) 0.9 part of butylthiostannoic acid [1]

[1] Not illustrative of present invention.

The percentage of tin metal parts of butylthiostannoic acid in each formulation was constant. Sheeted, divided into samples, the formulations were processed at 320° F. for 5 minutes on a two-roll mill and baked in a circulating air oven at 370° F. until complete degradation of the polymer was observed. During baking, samples were removed from the oven at 10 min. intervals and visually compared for discoloration with an unstabilized formulation. The unstabilized blend could not be milled and decomposed during processing.

System (a) is not according to the present invention and showed poor early color and developed a strong orange discoloration after 20 minutes of heat exposure. Total decomposition was reached after one hour.

System (b) showed an improvement in delaying development of early color for 10 minutes. This discoloration was of much lighter character than for system (a); strong discoloration was delayed for 50 minutes and the long term stability was extended 10 minutes.

System (c) demonstrated an excellent delay in the development of early color for over 30 minutes and significant degradation was not apparent until after 50 minutes of heat exposure.

System (d) the high level of butylthiostannoic acid reduced only slightly the times for early color, strong discoloration and long term stability.

System (e) is not illustrative of the present invention and showed significant degradation after 30 minutes of heat exposure.

TABLE I

| Systems | First discoloration in minutes | Strong discoloration | Decomposition |
|---|---|---|---|
| a | 0 | 20 | 60 |
| b | 10 | 50 | 70 |
| c | 50 | 50 | 70 |
| d | 30 | 40 | 60 |
| e | 20 | 30 | 50 |

EXAMPLE 2

Six resin formulations prepared according to Example 1, with 0.6 part of dibutyltin azelate and 0.6 part of butylthiostannoic acid, were notified respectively with one of the following phenols: (a) 0.13 part (10%) of para nonyl phenol; (b) 1.2 parts (50%) of para nonyl phenol; (c) 0.13 part of poly (alkyl phenol formaldehyde); (d) 1.2 parts of poly (alkylphenol formaldehyde); (e) 0.13 part of para cresol; and (f) 1.2 part of para cresol.

Each of the formulations was processed and compared by the procedure described in Example 1. The 10% formulations all exhibited improved clarity and initial color without significant decrease in long-term stability when compared with the resin formulation containing no cresol (System c of Example 1. The formulations containing a 50% level based on the total stabilizer composition still exhibited the improvement of clarification and initial color with only a very slight impairment of the stability exhibited by the system containing no phenol.

EXAMPLE 3

The test procedure using the same stabilizers as in Example 1 was repeated using a resin formulation of one hundred parts of PVC 40, a general purpose suspension polyvinyl chloride resin manufactured by the Diamond Shamrock Co. and 15 parts of dioctyl phthalate as plasticizer.

All systems exhibited the same stabilization during milling and the development of early color as the systems in Example 1. However, the long-term stabilization was consistently improved by 10 minutes in each of the formulations as expected.

EXAMPLE 4

Eleven systems were prepared by the procedure of Example 1 using 100 parts of Geon 103 EP resin, 0.5 parts of mineral oil and each system was stabilized with one of the following stabilizer systems:

(a) 1.3 part of dibutyltin maleate
(b) 1.2 part of dibutyltin maleate and 0.1 part of butylthiostannoic acid
(c) 0.55 part of dibutyltin maleate and 0.55 part of butylthiostannoic acid
(d) 1.1 part of dimethyltin maleate
(e) 0.9 part of dimethyltin maleate and 0.1 part of butylthiostannoic acid
(f) 0.5 part of dimethyltin maleate and 0.5 part of butylthiostannoic acid
(g) 0.8 part of butylthiostannoic acid and 0.1 part of dimethyltin maleate
(h) 2.4 parts of dibutyltin dilaurate
(i) 1.9 parts of dibutyltin dilaurate and 0.2 part of butylthiostannoic acid
(j) 0.7 part of dibutyltin dilaurate and 0.7 part of butylthiostannoic acid
(k) 0.9 part of butylthiostannoic acid and 0.1 part of dibutyltin dilaurate The results are presented in Table II. Stabilizer systems (a), (d) and (h) are not illustrative of the present invention; but were tested for comparative purposes.

TABLE II

| Systems | First discoloration in minutes | Strong discoloration | Decomposition |
|---|---|---|---|
| a | 50 | 70 | 80 |
| b | 70 | 90 | 100 |
| c | 50 | 90 | 100 |
| d | 0 | 40 | 60 |
| e | 10 | 60 | 70 |
| f | 30 | 60 | 80 |
| g | 30 | 40 | 70 |
| h | 0 | 10 | 60 |
| i | 40 | 40 | 60 |
| j | 50 | 60 | 80 |
| k | 40 | 40 | 60 |

EXAMPLE 5

Preparation of 8 formulations by the procedure of Example 1 using 100 parts of Geon 103 EP resin, 0.5 part of mineral oil and stabilizing each formulation with one of the following stabilizer systems will yield the results presented in Table III.

(a) 1.2 part of dibutyltin maleate and 0.1 part of monobutyltin sulfide
(b) 0.55 part of dibutyltin maleate and 0.55 part of monobutyltin sulfide (c) 0.9 part of dimethyltin maleate and 0.1 part of monobutyltin sulfide
(d) 0.5 part of dimethyltin maleate and 0.5 part of monobutyltin sulfide
(e) 0.8 part of monobutyltin sulfide and 0.1 part of dimethyltin maleate
(f) 1.9 parts of dibutyltin dilaurate and 0.2 part of monobutyltin sulfide
(g) 0.7 part of dibutyltin dilaurate and 0.7 part of monobutyltin sulfide
(h) 0.9 part of monobutyltin sulfide and 0.1 part of dibutyltin dilaurate

TABLE III

| Formulations | First discoloration in minutes | Strong discoloration | Decomposition |
|---|---|---|---|
| a | 70 | 90 | 100 |
| b | 50 | 90 | 100 |
| c | 10 | 60 | 70 |
| d | 30 | 60 | 80 |
| e | 30 | 40 | 70 |
| f | 40 | 40 | 60 |
| g | 50 | 60 | 80 |
| h | 40 | 40 | 60 |

EXAMPLE 6

Using a resin blend of 100 parts of PVC 40 resin, 10 parts of dioctyl phthalate and 0.5 part of glycerol monostearate, four formulations were prepared, each formulation was stabilized as set forth below:

(a) no stabilizer
(b) 3.0 part of dioctyltin bis (isooctyl maleate)
(c) 2.1 parts of the same and 0.2 part of monomethyltin sulfide
(d) 0.75 part of monomethyltin sulfide Systems a, b, and d are not illustrative of the present invention and were tested only for comparative purposes. The results of testing according to the procedure of Example 1 are presented in Table IV.

TABLE IV

| Systems | First discoloration in minutes | Strong discoloration | Decomposition |
|---|---|---|---|
| a | 10 | 20 | 50 |
| b | 60 | 70 | 80 |
| c | 70 | 80 | 90 |
| d | 30 | 50 | 60 |

We claim:
1. A synergistic stabilizer comprising an admixture of the following organotin stabilizers wherein 40 to 60 weight percent of said admixture is a dihydrocarbyltin carboxylate of the formula

$$[R_2Sn(O\overset{O}{\overset{\|}{C}}R')_2]_m$$

wherein R is an alkyl radical having 1 to 12 carbons, R' is selected from the group consisting of (1) a moiety of a hydrocarbyl acid selected from monobasic carboxylic acids, dibasic carboxylic acids and monoalkyl esters of said dibasic acids and (2) a thio ether derivative corresponding to a formula selected from the group consisting of —CH$_2$CH$_2$SR, —CH$_2$CH$_2$SCH$_2$CH$_2$$\overset{O}{\overset{\|}{C}}$—O—C$_{12}$H$_{25}$, —CH$_2$CH$_2$SCH$_2$CH

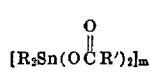

and

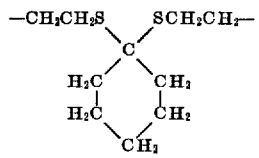

and m is an integer of at least 1 and 60 to 40 weight percent of said admixture is an organotin sulfur compound selected from the group consisting of monohydrocarbyltin sulfides and monohydrocarbyl thiostannoic acids having up to 12 carbon atoms.

2. The synergistic stabilizer of claim 1 wherein m is one.
3. The synergistic stabilizer of claim 1 wherein the dihydrocarbyltin carboxylate and the organotin sulfur compound are present in about equal amounts by weight.
4. The synergistic stabilizer of claim 1 wherein R' is selected from the group consisting of —CH$_3$, —CH$_2$CH$_3$, —CH$_2$CH$_2$CH$_3$, —CH(CH$_3$)$_2$, —CH$_2$(CH$_2$)$_2$CH$_3$, —CH$_2$(CH$_2$)$_3$CH$_3$, $$-CH_2\overset{CH_3}{\overset{|}{C}}HCH_2CH_3$$

—CH$_2$(CH$_2$)$_8$CH$_3$, —CH=CH$_2$, $$-\overset{CH_3}{\overset{|}{C}}=CH_2$$

—CH=CHCH$_3$, —CH=CH(CH$_2$)$_2$CH$_3$, —C$_6$H$_5$,

—CH$_3$—, —CH$_2$COOR, —CH$_2$CH$_2$—, —CH$_2$CH$_2$COOR, $-\overset{CH_3}{\overset{|}{C}}HCH_2-$, $-\overset{CH_3}{\overset{|}{C}}HCH_2COOR$ —CH$_2$CH$_2$CH$_2$—, —CH$_2$(CH$_2$)$_2$COOR
—CH$_2$(CH$_2$)$_2$CH$_2$—, —CH$_2$(CH$_2$)$_3$COOR
—CH$_2$(CH$_2$)$_5$CH$_2$—, —CH$_2$(CH$_2$)$_6$COOR
—CH=CH—, —CH=CHCOOR
—CH=CHCH$_2$—, —CH=CHCH$_2$COOR
—CH$_2$CH$_2$SR

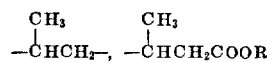

and

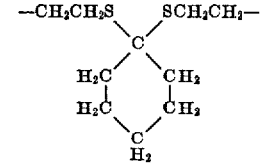

5. The synergistic combination of claim 4 wherein R is selected from the group consisting of methyl, ethyl, butyl, isobutyl, octyl, isooctyl and dodecyl.
6. A stabilizer system comprising at least 50 weight percent of the stabilizer of claim 1 and an effective amount up to 50 weight percent of an alkyl phenol having 1 to 12 carbons in the alkyl or a formaldehyde condensation product of said alkyl phenol.
7. The stabilizer system of claim 6 containing 1 to 50 weight percent of an alkyl phenol selected from the group consisting of meta-cresol, para-nonylphenol, para-dodecylphenol and para-octylphenol.
8. The stabilizer system of claim 6 containing 1 to 50 weight percent of a condensation product of formaldehyde and an alkyl phenol.
9. The stabilizer system of claim 8 wherein the condensation product is poly (orthomethylene-para-octylphenol).

10. A resin composition comprising a polyvinyl halide resin selected from the group consisting of a homopolymer of vinyl chloride or vinylidene chloride and copolymers containing at least 50 percent by weight of vinyl chloride or vinylidene chloride and an effective amount of the synergistic stabilizer defined in claim 1.

11. A resin composition comprising a polyvinyl halide resin selected from the group consisting of a homopolymer of vinyl chloride or vinylidene chloride and copolymers containing at least 50 percent by weight of vinyl chloride or vinylidene chloride and an effective amount of the synergistic stabilizer defined in claim 6.

12. A polyvinyl chloride resin composition containing 0.01 to 5 weight percent of the synergistic stabilizer of claim 1.

13. A polyvinyl chloride resin composition containing 0.01 to 5 weight percent of the synergistic stabilizer of claim 6.

14. The polyvinyl chloride resin composition of claim 12 wherein said dihydrocarbyl tin carboxylate is selected from the group consisting of dibutyl tin bis (isooctyl azelate) and dibutyltin bis (isooctyl maleate), and said organotin sulfur compound is selected from the group consisting of monomethyltin sulfide, methyl thiostannoic acid, monobutyl tin sulfide and butyl thiostannoic acid.

15. The polyvinyl chloride resin composition of claim 13 wherein said dihydrocarbyl tin carboxylate is selected from the group consisting of dibutyl tin bis (isooctyl azelate) and dibutyltin bis (isooctyl maleate), and said organotin sulfur compound is selected from the group consisting of monomethyltin sulfide, methyl thiostannoic acid, monobutyl tin sulfide and butyl thiostannoic acid.

16. The polyvinyl chloride resin composition of claim 15 wherein the alkyl phenol is selected from the group consisting of para-octyl phenol and para-nonyl phenol.

17. The polyvinyl chloride resin composition of claim 15 wherein the formaldehyde condensation product is poly (orthomethylene-para-octyl phenol).

References Cited

UNITED STATES PATENTS

| 2,270,959 | 1/1942 | Murke et al. | 260—45.75 |
| 3,021,302 | 2/1962 | Frey et al. | 260—45.75 |
| 3,222,317 | 12/1965 | Kauder | 260—45.75 |

OTHER REFERENCES

Modern Plastics Encyclopedia, 1965, article on pp. 390–393, by Robin, entitled "Antioxidants."

Rohm and Haas Co., bulletin (Philadelphia, Penn.), entitled "Organic Chemicals," p. 9, Dec. 15, 1964.

DONALD E. CZAJA, Primary Examiner

V. P. HOKE, Assistant Examiner

U.S. Cl. X.R.
252—406; 260—23 XA, 45.95, 897 C